United States Patent [19]

Spelts

[11] Patent Number: 4,843,754
[45] Date of Patent: Jul. 4, 1989

[54] FISHHOOK AND LURE

[76] Inventor: Harold F. Spelts, 300 E. Tropicana Ave., Space 28, Las Vegas, Nev. 89109

[21] Appl. No.: 173,669

[22] Filed: Mar. 25, 1988

[51] Int. Cl.⁴ ............................................ A01K 85/00
[52] U.S. Cl. .................................... 43/42.1; 43/42.28; 43/42.39; 43/44.81
[58] Field of Search ................ 43/42.28, 42.24, 42.37, 43/42.1, 42.41, 44.81, 41

[56] References Cited

U.S. PATENT DOCUMENTS

| | | |
|---|---|---|
| 167,687 | 9/1875 | Pitcher . |
| 497,962 | 5/1893 | D'Ivernois . |
| 1,103,707 | 7/1914 | Threm . |
| 1,295,370 | 2/1919 | Porter . |
| 2,775,842 | 1/1957 | McCode ........................... 43/44.81 |
| 2,795,886 | 6/1957 | Johnson ........................... 43/44.81 |
| 2,989,817 | 6/1961 | Kepler ............................. 43/42.39 |
| 3,121,291 | 2/1964 | Iffland ............................. 43/44.81 |
| 3,186,123 | 6/1965 | Freeman .......................... 43/42.1 |
| 3,497,987 | 3/1970 | Perrin ............................. 43/42.28 |
| 3,590,514 | 7/1971 | Begley ............................. 43/42.53 |
| 3,611,614 | 12/1971 | Ward .............................. 43/42.24 |
| 3,750,321 | 8/1973 | McClellan ....................... 43/42.39 |
| 3,750,323 | 8/1973 | Weis ............................... 43/42.28 |
| 3,868,784 | 3/1975 | Sabol .............................. 43/42.37 |
| 3,883,979 | 5/1975 | Williams ......................... 43/42.28 |
| 3,965,606 | 6/1976 | Bingler ........................... 43/42.37 |
| 4,123,870 | 11/1978 | Wiskirchen .................... 43/42.37 |
| 4,433,503 | 2/1984 | Schleif ............................ 43/42.1 |
| 4,771,567 | 9/1988 | Cannon .......................... 43/42.39 |

FOREIGN PATENT DOCUMENTS 816178 7/1959 United Kingdom ............ 43/44.81

OTHER PUBLICATIONS

Article discussing Gitzit lures, Sports Afield Magazine, Jan., 1988 issue, p. 26.

Primary Examiner—Gene P. Crosby
Attorney, Agent, or Firm—Quirk, Tratos & Roethel

[57] ABSTRACT

A fishhook has a tapered conical sinker mounted on the upper end of the shank. The eyelet is offset at a 90° angle to the shank. When this fishhook is mounted in an artificial lure, the entire fishhook, except the eyelet, is hidden by the body of the lure. The fishhook is sized to fit the lure so that there is no significant distortion of the lure. The position of the eyelet and the sinker prevent the lure from rotating during retrieval and the lure rides naturally in the water.

10 Claims, 1 Drawing Sheet

FISHHOOK AND LURE

BACKGROUND OF THE INVENTION

1. Field of the Invention

The invention relates generally to fishhooks and more specifically to fishhooks used in combination with artificial fishing lures. The fishhook has an eyelet and sinker specially designed so that the artificial lure hides the entire fishhook except for the protruding eyelet.

2. Description of the Prior Art

There is a plethora of prior art patents showing fishhooks designed to be used both with and without artificial lures. In practice, these prior art devices all have shortcomings that make their use either impractical or ineffective.

Fairly typical of the prior art fishhooks and artificial lures is the disclosure in U.S. Pat. No. 3,950,514 to Begley. The sinker extends beyond the end of the shank and eyelet so that the eyelet protrudes from the side of the sinker. As the Begley device is retrieved, it is easily snaggable on any weeds or foreign object in the water. The barb extends outside the body of the artificial lure which also makes it amenable to snagging on weeds and foreign objects.

U.S. Pat. No. 3,121,291 to Iffland et al. discloses a tapered sinker with an eyelet extending out of the end of the sinker, but this fishhook is not used in connection with an artificial lure. This fishhook sits on the bottom of a lake and is not designed to be retrieved during the actual course of fishing.

Finally, U.S. Pat. No. 3,497,987 to Perrin discloses a fishhook combined with an artificial lure. Again the barb of the fishhook extends outside the body of the lure. The sinker is formed as an integral part of the head of the lure thereby prohibiting rapid substitution of a different artificial lure on the same fishhook.

BRIEF SUMMARY OF THE INVENTION

It is an object of this invention to provide a fishhook that mitigates the deficiencies that are suffered by the prior art. It is a further object of this invention to provide a fishhook that is easily interchangeable with any number of artificial lures. Once the fishhook is set into an artificial lure, the fishhook itself should be hidden from the fish so that when the fish approaches the lure, the fish only detects what appears to be a natural object. As the fish attempts to swallow the lure, the fish should not sense any unnatural object such as the wire of the hook or the lead of the sinker.

When the lure is retrieved through the water, the lure should not spin or rotate around its longitudinal axis since live bait would not spin when moving through the water. The lure should also ride through the water the same way live bait would move, viz. with its head up and its tail down.

People who make their living by professional sport fishing demand the best in equipment. Many professional contests are based on catching the most poundage of fish in a predetermined length of time. Many thousands of dollars are awarded as prizes and often the difference between winning $50,000 and $20,000 can be as little as one-third of a pound.

In order to be successful in professional sport fishing, a fisherman must maximize his chances to catch the most and the largest fish. The present invention is particularly adaptable to professional sport fishing, and most particularly to use in professional bass tournaments.

DESCRIPTION OF THE PREFERRED EMBODIMENTS

Figure 1:
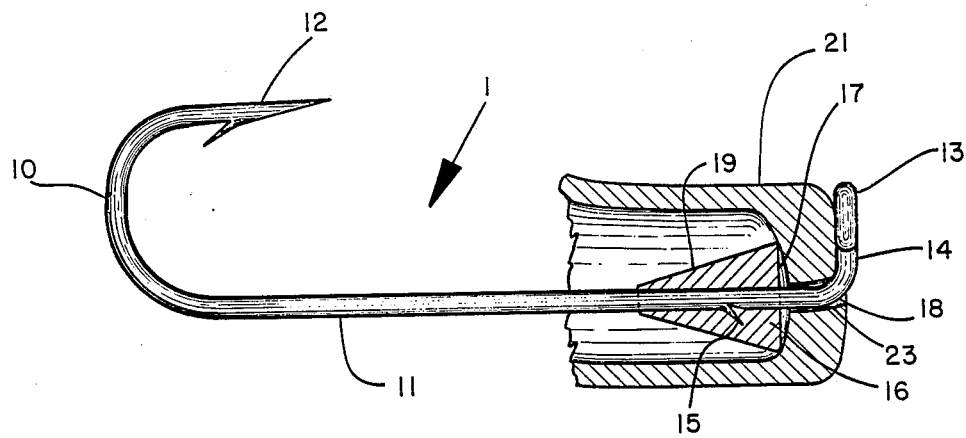
FIG. 1 shows a side view of the fishhook of the present invention.

The fishhook of the present invention is shown generally at 1. The shank 11 is shaped into a hook 10 at one end and the hook ends in a barb 12 which is laterally radially offset from the shank 11. At the end of shank 11 opposite from the hook 10, an eyelet 13 is joined to the shank 11 by an eyelet connecting means or shank extension 14. The eyelet connecting means or shank extension 14 is preferably formed by simply bending the end of the shank 11 during the fabrication of the fishhook 1. Similarly, the eyelet 13 is also formed during the fabrication of the fishhook 1 by simply bending the end of the eyelet connecting means or shank extension 14 back upon itself to form a generally circular loop or torus. The eyelet 13, eyelet connecting means 14, hook 10 and barb 12 are arranged generally coplanar.

After the fishhook 1 has been fabricated, an oblique knife cut is made into the surface of the shank 11 which produces a prong 15. A sinker 16 is then formed around the shank 11 so that the sinker 16 encompasses the prong 15. The sinker 16 can be formed out of any suitable material, such as lead, and attached to the shank 11 in any suitable manner, such as lead molding. The prong 15 provides additional support to hold the sinker 16 on the shank 11. This prevents the sinker 16 from either sliding longitudinally along the shank 11 or from rotating around the axis of the shank 11.

The particular shape of the sinker 16 is an important aspect of the present invention. The portion of the sinker closest to the eyelet connecting means or shank extension 14 should have a flat end or base 17 to inhibit the sinker from being pulled through the end of an artificial lure mounted on the fishhook 1 as will be more fully explained herein. The preferred shape for the sinker 16 is generally conical with the tapering portion of the cone lying coaxially with the shank 11. The flat end or base 17 of the sinker 16 faces toward the end of the shank that carries the eyelet connecting means 14 and the eyelet 13. The maximum diameter or width of the sinker 16 occurs at the flat end 17 and the diameter is selected so that the entire sinker 16 fits within an artificial lure as will be explained more fully herein. It is important to the objects of the invention that, in use, the entire sinker 16 is covered by an artificial lure so that a fish will not sense or feel any part of the fishhook 1, including the barb 12 or the sinker 16, when the fish approaches or closes its mouth on the lure.

Alternatively, the sinker 16 may be formed in a variety of shapes as long as the base 17 is flat. For example, the sinker 16 may be formed in the shape of a prism, a cylinder or a pyramid as well as the cone shown in FIGS. 1 and 2.

Figure 2:
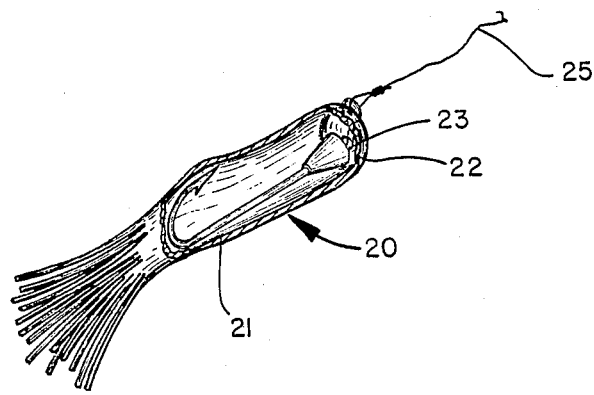
FIG. 2 shows the fishhook of the present invention in combination with an artificial lure.

The location of the sinker 16 along the length of the shank 11 is also important to the objects of the invention. As an artificial lure is retrieved through the water, it is desirable for the lure to simulate, as nearly as possible, the actions of natural bait so that the artificial lure will attract fish. In the present invention, the sinker 16 is located on the shank 11 adjacent to the bend 18 where the shank 11 joins the eyelet connecting means 14. The angle of the bend 18 is selected such that the eyelet 13 is offset from the axis of the shank 11 and this angle is preferably about 90°. This configuration allows the fishhook 1, and an artificial lure 20 carried by the fishhook 1, to ride through the water with the eyelet 13 in a relatively upward orientation is depicted in FIG. 2. Having the eyelet 13 offset from the axis of shank 11 also mitigates the tendency of either the fishhook 1 or the artificial lure 20 to rotate around the axis of the shank 11 as the lure is retrieved through the water. Any axial rotation detracts from the desire to have the artificial lure behave like live bait.

It is often desirable to have differently weighted fishhooks so that the speed in which the fishhook sinks through the water can be varied. The weight of the fishhook of the present invention can be varied by changing the size of the sinker. During the molding process, the sinker 16 can be made longer by extending it along the length of the shank 11 to make the sinker 16 heavier without changing the diameter of flat end 17. A longer sinker 16 yields a heavier fishhook 1.

FIG. 2 shows the fishhook 10 of the present invention mounted inside a typical one-piece artificial lure 20. The fishhook 1 can be used with known artificial lures such as the Fat Gitzit or the Jumbo Gitzit, which are available from Bass 'n Man Lure Co., Dept. 5A, P. 0. Box 340, Washington, Utah. These artificial lures are typically formed of extremely soft, almost jelly-like plastic. The plastic is semitransparent and may be colored as desired to resemble natural baits. The artificial lures are externally shaped to resemble insects or other natural bait.

The objects of the present invention are further achieved through specific design relationships between the lure 20 and the fishhook 1. The lateral radial offset distance from the tip of the barb 12 to the shank 11 is selected to approximately coincide with the inside diameter of the body 21 of the lure. If this lateral radial offset distance is much smaller than the inside diameter of the body 21, then the fishhook 1 may flop around inside the lure and the fish may be able to bite on the lure without contacting the barb 12. If this lateral radial offset distance is larger than the inside diameter of the body 21 of the lure, then the fishhook 1 will significantly distort the body of the lure detracting from the intended natural appearance of the lure as live bait. In this situation, the barb 12 will also tend to puncture through the surface of the body 21 during the movement of the lure during casting and retrieving. When a fish approaches the lure, the fish may sense or feel a hook that has punctured through a lure as the mouth of the fish closes about the lure. The fish may then realize that the lure is not natural bait and withdraw from the lure. An exposed barb 12 is also susceptible to snagging on weeds or other foreign objects in the water.

The diameter of the flat end or base 17 of the sinker 16 must also be smaller than the inside diameter of the body 21 of the lure 20. This likewise prevents the sinker 16 from distorting the appearance of the lure. The flat end 17 of the sinker 16 also functions as an abutment surface to prevent the fishhook 1 from being pulled through the closed end 22 of the body 21 of the lure as the lure is being retrieved through the water.

A small aperture 23 approximately the diameter of shank 11 is provided in the otherwise closed end 22 of the body 21 of the lure. Due to the exceptional pliability of the lure 20, the fishhook 1 can be inserted into the lure eyelet-end first with the eyelet 13 and the eyelet connecting means or shank extension 14 passing through the aperture 23 in the otherwise closed end 22 of the lure 20. The flat end or base 17 of the sinker 16 then abuts against the closed end 22 of the lure 20. The fishhook 1 is fully inserted into the body 21 of the lure 20 when only the eyelet 13 and the eyelet connecting means 14 remain on the outside of the body 21 of the lure 20 as shown in FIG. 1. Since the diameter of flat end 17 of the sinker 16 is relatively larger than the diameter of the aperture 23, the flat end 17 serves as an abutment surface and prevents the fishhook 1 from being pulled out of the body 21 of the lure 20 when force is applied to the eyelet 13 by the fishing line 25 during the act of casting and retrieving the lure.

Another important feature of the present invention is the position of the eyelet 13 in relation to both the closed end 22 and the diameter of the body 21 of the lure 20. The radial offset distance of the eyelet 13 should not extend beyond the lateral surface of the body 21 when the fishhook 1 is mounted in the lure 20 as shown in FIGS. 1 and 2. Because of the pliability of the lure 20, the eyelet 13 and the eyelet connecting means or shank extension 14 will closely abut the closed end 22 of the lure 20. If the eyelet 13 extends beyond the lateral surface of the body 21, the eyelet will be susceptible to snagging on weeds or other foreign objects in the water. Also, the eyelet 13 would then present an unnatural object that a fish may sense or feel as the fish bites on the lure.

If the eyelet 13 is located directly in line with the axis of shank 11, the pulling force from fishing line 25 on eyelet 13 would promote spinning or rotation of the lure 20 along the axis of shank 11 which detracts from the intended natural appearance of the lure. Both snagging and rotation of the lure 20 are discouraged by having the eyelet 13 offset radially from the axis of the shank 11 with the length of the offset limited to being no more than the radial distance from the aperture 23 to the lateral surface of the body 21.

Another important feature of the invention is the distance from the flat end 17 of the sinker 16 to the eyelet connecting means or shank extension 14 and the eyelet 13. The sinker 16 is mounted on the shank 11 at a point along the shank that is remote from the point at which the eyelet connecting means or shank extension 14 joins the shank 11. This distance is selected so that the thickness of the wall of the lure 20 fits snugly between the flat end 17 of the sinker 16 and the eyelet connecting means 14 and the eyelet 13 as shown in FIG. 1. This arrangement minimizes the amount of hook material that is outside of the body of the lure 20 during use.

Another advantage of the present invention is realized by having the eyelet connecting means or shank extension 14 joined to the shank 11 at the location of and on the outside of the aperture 23 in the closed end 22 of the lure 20. As casting and retrieving of the lure proceeds during the act of fishing, the barb 12 will begin to dig into the surface of the body 21. This will also occur as fish nibble at the lure but are not caught. Eventually barb 12 will wear through the surface of the body 21 and begin to stick out of the lure. This exposed barb 12 will then cause the lure 20 to be susceptible to snagging. Also, fish will be able to sense or feel the exposed barb which detracts from the intended natural bait effect of the artificial lure.

If the barb 12 wears through the surface of body 21, this condition can be easily corrected. The fisherman merely manually rotates the body 21 of the lure 20 around the axis of the shank 11 until the barb 12 abuts a "fresh meat" area on the body 21. This manual rotation of body 21 can be accomplished because the fishhook 1 is only press fit into the lure 20, aperture 23 is coaxial with shank 11 and the eyelet connecting means 14 joins the shank 11 at the location of and on the outside of the aperture 23.

During professional sport fishing, and particularly during professional bass fishing tournaments, speed is critical because of the time limits imposed on the participants. The present invention allows a participant in a tournament to change the type of artificial lure 20 being used without the necessity of disconnecting the fishhook 1 from the fishing line 25. It is merely a matter of sliding one lure off and substituting a different lure in its place. Thus a tournament participant can utilize many different types of artificial lures until he discovers which lure is the most effective that particular day.

While the fishhook of the present invention can be made in a variety of sizes, the preferred embodiments contemplate a size 1/0 fishhook and a size 2 fishhook.

The size 1/0 fishhook is made from 0.052" diameter steel wire. The eyelet 13 is formed in the shape of a generally circular loop or torus having an inside diameter of approximately 0.055 inches. The eyelet 13 extends at an angle of approximately 90° to the shank 11 and the distance from the farthest tip of the eyelet 13 to shank 11 is about 7.0 mm. The prong 15 is cut into the shank 11 at a location about 8.7 mm from the eyelet end of the shank. The flat end 17 of the sinker 16 lies along the shank 11 about ⅛" from the eyelet 13. The lateral radial offset distance from the barb 12 to the shank 11 is about 13.0 mm and the overall length of the size 1/0 fishhook is about 52.5 mm.

The size 2 fishhook is made from 0.044" diameter steel wire. The eyelet 13 has an inside diameter of about 0.047" and the distance from the farthest tip of the eyelet 13 to the shank 11 is about 7.0 mm. The prong 15 is cut into the shank 11 at a location about 8.7 mm from the eyelet end of the shank. The flat end 17 of the sinker 16 lies along the shank 11 about ⅛" from the eyelet 13. The lateral radial offset distance from the barb 12 to the shank 11 is about 11.0 mm and the overall length of the size 2 fishhook is about 42.5 mm. The size 2 fishhook has generally the same configuration as the size 1/0 fishhook.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

I claim:

1. An artificial fishing lure comprising a shank, a hook at one end of the shank, an eyelet at the opposite end of the shank, a sinker attached to the shank between the eyelet and the hook the entire length of the sinker lying along the shank, and a hollow elongated body mounted coaxially around and enclosing the shank, the hook and the sinker and having an aperture therein through which the shank extends, the sinker including means for preventing the sinker from being pulled through the aperture in the hollow elongated body when the fish strikes the lure.

2. The artificial fishing lure as described in claim 1 wherein said means is a flat end of the sinker.

3. The artificial fishing lure as described in claim 1 including means for connecting the eyelet to the shank at a point along the shank remote from the point on the shank at which the sinker is attached.

4. The artificial fishing lure as described in claim 3 wherein the eyelet connecting means is attached to the shank at an angle of approximately 90°.

5. The artificial fishing lure as described in claim 3 wherein the eyelet connecting means is a shank extension.

6. The artificial fishing lure as described in claim 1 wherein a barb is attached to the end of the hook.

7. The artificial fishing lure as described in claim 6 wherein the radial distance from the shank to the barb of the hook is not larger than the inside diameter of the hollow elongated body so that when the hook is mounted inside the hollow elongated body the hook does not significantly distort the shape of the hollow elongated body.

8. The artificial fishing lure as described in claim 2 wherein the eyelet connecting means is attached to the shank at the point where the end of the hollow elongated body terminates so that the hollow elongated body can be rotated about the longitudinal axis of the shank.

9. The artificial fishing lure as described in claim 1 wherein the hook, sinker and shank are completely enclosed within the elongated body and only the eyelet and the eyelet connecting means extend outside the elongated body.

10. The artificial fishing lure as described in claim 1 wherein the sinker is mounted on the shank at the end of the elongated body remote from the hook but completely inside the elongated body.

* * * * *